United States Patent
Wakamoto

(10) Patent No.: US 12,430,671 B2
(45) Date of Patent: Sep. 30, 2025

(54) SERVER DEVICE, MATCHING METHOD, AND RECORDING MEDIUM

(71) Applicant: Rakuten Group, Inc., Tokyo (JP)

(72) Inventor: Hiroshi Wakamoto, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 18/613,742

(22) Filed: Mar. 22, 2024

(65) Prior Publication Data

US 2024/0330985 A1    Oct. 3, 2024

(30) Foreign Application Priority Data

Mar. 28, 2023  (JP) .................................. 2023-051768

(51) Int. Cl.
*G06Q 30/02*      (2023.01)
*G06Q 30/0251*    (2023.01)
*G06Q 30/0273*    (2023.01)

(52) U.S. Cl.
CPC ..... *G06Q 30/0271* (2013.01); *G06Q 30/0254* (2013.01); *G06Q 30/0257* (2013.01); *G06Q 30/0275* (2013.01)

(58) Field of Classification Search
CPC .......... G06Q 30/0271; G06Q 30/0254; G06Q 30/0257; G06Q 30/0275; G06Q 30/02; G06Q 30/0269; G06Q 30/0207–30/0277
See application file for complete search history.

(56) References Cited

U.S. PATENT DOCUMENTS

| | | | | |
|---|---|---|---|---|
| 11,042,896 B1* | 6/2021 | Snyder | ............... | G06Q 30/0251 |
| 11,080,737 B1* | 8/2021 | Kalra | ................. | G06F 16/9566 |
| 11,836,741 B2* | 12/2023 | Gurbuxani | ............. | G06N 3/044 |
| 2006/0287915 A1* | 12/2006 | Boulet | ............... | G06Q 30/0269 |
| | | | | 348/E7.071 |
| 2007/0130015 A1* | 6/2007 | Starr | ..................... | H04N 21/858 |
| | | | | 705/14.46 |
| 2008/0109306 A1* | 5/2008 | Maigret | ............... | G06Q 20/123 |
| | | | | 705/14.46 |
| 2013/0343726 A1* | 12/2013 | Shackleton | ........... | G06F 16/735 |
| | | | | 386/282 |
| 2015/0163311 A1* | 6/2015 | Heath | .................... | G06Q 50/01 |
| | | | | 709/204 |
| 2016/0034935 A1* | 2/2016 | Neb | .................... | G06Q 30/0214 |
| | | | | 705/14.16 |

(Continued)

FOREIGN PATENT DOCUMENTS

| | | |
|---|---|---|
| JP | 2019-152937 A | 9/2019 |
| JP | 2021-117559 A | 8/2021 |
| JP | 2022-66113 A  | 4/2022 |

OTHER PUBLICATIONS

Japanese Office Action dated Mar. 25, 2025 in Application No. 2024-092408.

*Primary Examiner* — Thuy N Nguyen

(74) *Attorney, Agent, or Firm* — Sughrue Mion, PLLC

(57) ABSTRACT

In a server device, a user information acquirer acquires user information about a target user, among users that have accessed a second service (for example, an affiliated service such as a sales service) via link information set in content that a content creator has posted to a first service (for example, an external service), that has an account with the second service. A processor uses the user information to perform processing for assisting matching of a sponsor and the content creator.

6 Claims, 13 Drawing Sheets

(56) References Cited

U.S. PATENT DOCUMENTS

| | | | |
|---|---|---|---|
| 2017/0193531 A1* | 7/2017 | Fatourechi | G06Q 30/0201 |
| 2018/0293602 A1* | 10/2018 | Glazier | G06Q 30/0239 |
| 2020/0160395 A1* | 5/2020 | Kuwadekar | G06F 9/45558 |
| 2021/0118014 A1* | 4/2021 | Yamauchi | G06Q 30/0273 |
| 2021/0232942 A1* | 7/2021 | Lo | G06N 20/00 |
| 2022/0058753 A1* | 2/2022 | Bodin | G06F 16/9536 |
| 2024/0005340 A1* | 1/2024 | Woo | G06Q 30/0241 |
| 2024/0013252 A1* | 1/2024 | Box | G06Q 30/0243 |

* cited by examiner

FIG. 4

| SPONSOR ID 131a | SPONSOR NAME 131b | OFFERED PRODUCT/SERVICE 131c | PROMOTION TARGET 131d | ... |
|---|---|---|---|---|
| SP-01001 | XX BEVERAGES | SOFT DRINKS, ALCOHOLIC DRINKS, ... | NATURAL WATER XX | ... |
| SP-01002 | YY ELECTRONICS | HOME ELECTRONICS, VIDEO EQUIPMENT, ... | BIGSCREEN TV YY | ... |
| SP-01003 | ZZ TRAVEL | FLIGHT RESERVATIONS, HOTEL RESERVATIONS, ... | EARLY BIRD TOUR ZZ | ... |
| SP-01004 | AA AUTOMOTIVE | AUTOMOBILES, MOTORCYCLES, ... | NEW MODEL SEDAN AA | ... |
| SP-01005 | BB FOODS | PROCESSED FOODS, SNACKS, ... | CURRY ROUX BB | ... |
| .. | .. | .. | .. | .. |

| CONTENT CREATOR ID | HANDLE NAME | PLATFORM | NUMBER OF REGISTERED USERS | ... |
|---|---|---|---|---|
| INF-ABC | AAA | SNS OF COMPANY A | 20,000 | ... |
| INF-BCD | BBB | VIDEO STREAMING OF COMPANY B | 50,000 | ... |
| INF-CDE | CCC | BLOG OF COMPANY C | 30,000 | ... |
| INF-DEF | DDD | SNS OF COMPANY D | 40,000 | ... |
| INF-EFG | EEE | GAME STREAMING OF COMPANY E | 10,000 | ... |
| : | : | : | : | : |

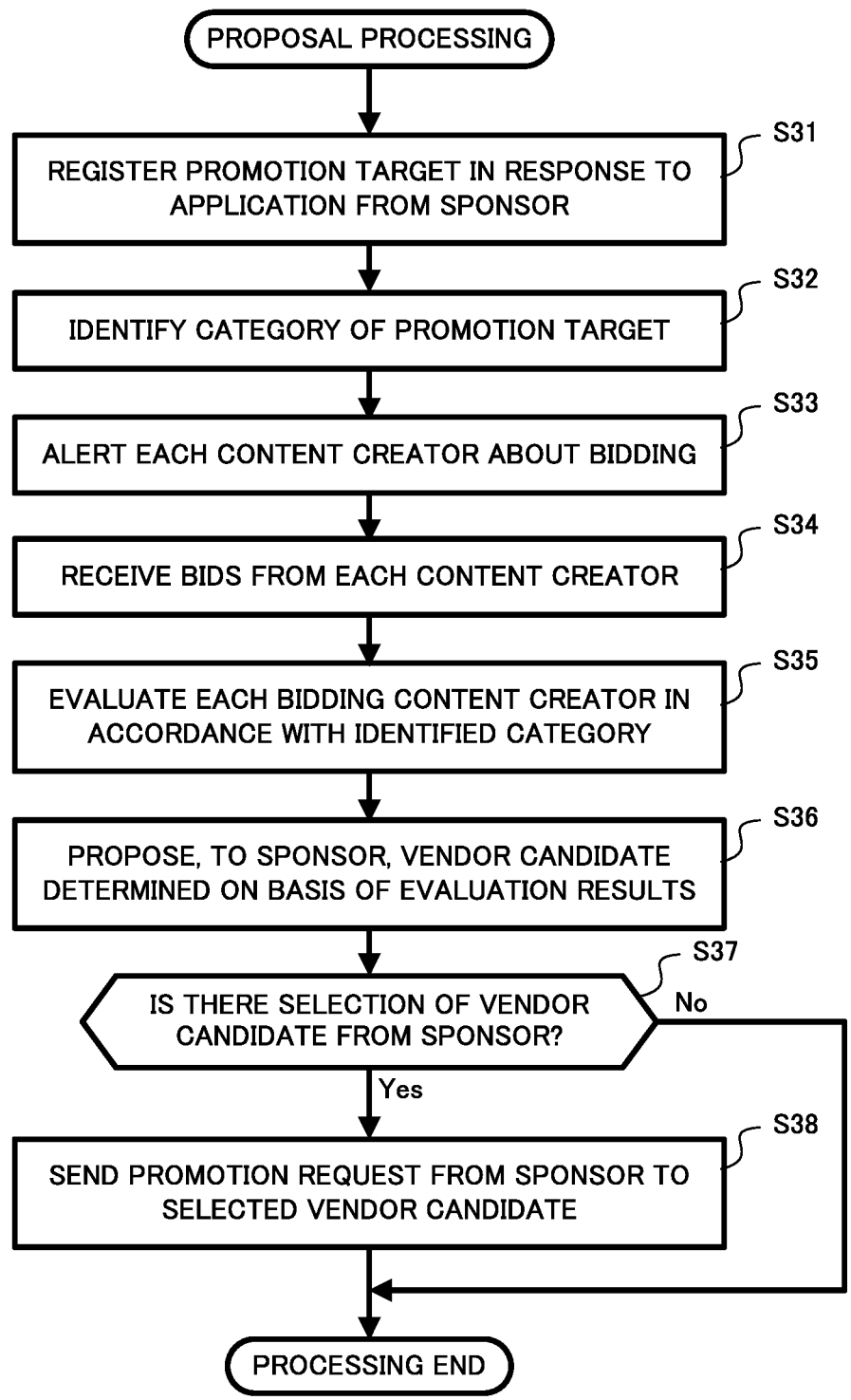

SERVER DEVICE, MATCHING METHOD, AND RECORDING MEDIUM

CROSS-REFERENCE TO RELATED APPLICATIONS

This application claims the benefit of Japanese Patent Application No. 2023-051768, filed on Mar. 28, 2023, the entire disclosure of which is incorporated by reference herein.

FIELD OF THE INVENTION

This application relates generally to a server device, a matching method, and a recording medium.

BACKGROUND OF THE INVENTION

In recent years, a method of promotion called "influencer marketing" has gathered attention. In influencer marketing, a company or the like that provides products and/or services become a sponsor and has a content creator (a so-called "influencer") that posts content and disseminates information promote a product or the like of the company.

For example, the sponsor has a popular content creator post, on some sort of service such as a video posting service, a social networking service (SNS), or a blog, content (a review video, a review comment, a review article, or the like) about a promotion target (a product or service of the sponsor) and, as a result, users that view (browse) that content are encouraged to purchase or use the promotion target.

In this manner of influencer marketing, it is important to select an appropriate content creator in accordance with the promotion target.

To accomplish this, for example, Unexamined Japanese Patent Application Publication No. 2021-117559 describes the invention of an information processing system (information processing device) that analyzes a degree of influence related to a product and presents a content creator (influencer) that is highly influential. With this information processing system, information about a user and information about a content creator related to that user are acquired from an SNS system on the basis of a telephone number of the user that purchased the product, and the degree of influence, related to that product, of the content creator is analyzed on the basis of the acquired information.

With the information processing system described in Unexamined Japanese Patent Application Publication No. 2021-117559, the analysis is performed on the basis of the information of the user associated with the telephone number, and a content creator that is highly influential is presented.

However, with many SNS systems, settings for whether to allow searching by telephone number can be selected on the user side, and there are many users that, from the perspective of privacy, set so as to not allow searching by telephone number. Moreover, some users do not register a telephone number and, in these cases as well, cannot be searched. Consequently, with the information processing system described in Patent Literature 1, it is not possible to sufficiently acquire information about active users and, as a result, there is a problem in that the presentation of an appropriate content creator cannot be expected.

Due to this, there is a demand for technology for presenting a more suitable content creator to a sponsor.

SUMMARY OF THE INVENTION

The present disclosure is made with the view of the above situation, and an objective of the present disclosure is to provide a server device, a matching method, and a recording medium capable of presenting a more suitable content creator.

A server device according to a first aspect of the present disclosure includes:
  a user information acquirer that acquires user information about a target user, among users that have accessed a second service via link information set in content that a content creator posts to a first service, that has an account with the second service; and
  a processor that uses the user information to perform processing for assisting matching of a sponsor and the content creator.

The server device according to the aspect described above, wherein the user information acquirer may identify, based on information obtained when the second service is accessed via the link information and for each of a plurality of the content creator, correspondence between the content creator and the target user, and acquire the user information associated with each of the content creator.

The server device according to the aspect described above, wherein the processor may select, based on processing results obtained by performing statistical processing on the user information associated with each of the plurality of the content creator and from among the plurality of the content creator, a vendor candidate to which promoting is to be requested.

The server device according to the aspect described above, wherein the processor may perform the statistical processing in accordance with a product or a service, that is a promotion target, that a sponsor desires to promote, and select, based on the obtained processing results, the vendor candidate to which promoting of the promotion target is to be requested.

The server device according to the aspect described above, wherein the processor may, in the statistical processing, derive, based on a plurality of statistical values, a score value, and select the vendor candidate in accordance with the derived score value.

The server device according to the aspect described above, wherein the processor may sort, based on the processing results, a list of the vendor candidate in which a plurality of the content creator is included.

The server device according to the aspect described above, further including:
  a request receiver that receives, from the sponsor, a promotion request including a category to which the promotion target belongs or information for identifying the category, wherein
  the processor may perform the statistical processing in accordance with the category, and select, based on the processing results, the vendor candidate.

The server device according to the aspect described above, wherein the user information acquirer may acquire the user information that includes at least any one among age information, gender information, salary information, vehicle ownership information, bank account information, insurance enrollment information, securities account information, and purchase history information.

The server device according to the aspect described above, further including:
  a bid receiver that receives a bid from each content creator of the plurality of content creators, wherein the processor may select, based on the processing results for each content creator of the plurality of content creators that enters the bid, the vendor candidate.

A matching method according to a second aspect of the present disclosure is a matching method executed by a server device, the method including:

acquiring user information about a target user, among users that have accessed a second service via link information set in content that a content creator posts to a first service, that has an account with the second service; and performing processing, using the user information, for assisting matching of a sponsor and the content creator.

A recording medium according to a third aspect of the present disclosure is a non-transitory computer-readable recording medium storing a program that causes a computer to:

acquire user information about a target user, among users that have accessed a second service via link information set in content that a content creator posts to a first service, that has an account with the second service; and execute processing, using the user information, for assisting matching of a sponsor and the content creator.

According to the present disclosure, it is possible to present a more suitable content creator to a sponsor.

BRIEF DESCRIPTION OF DRAWINGS

A more complete understanding of this application can be obtained when the following detailed description is considered in conjunction with the following drawings, in which:

FIG. 4 is a schematic drawing illustrating an example of sponsor information;

FIG. 5 is a schematic drawing illustrating an example of content creator information;

FIG. 13 is a flowchart for explaining proposal processing according to Embodiment 2.

DETAILED DESCRIPTION OF THE INVENTION

Figure 1:
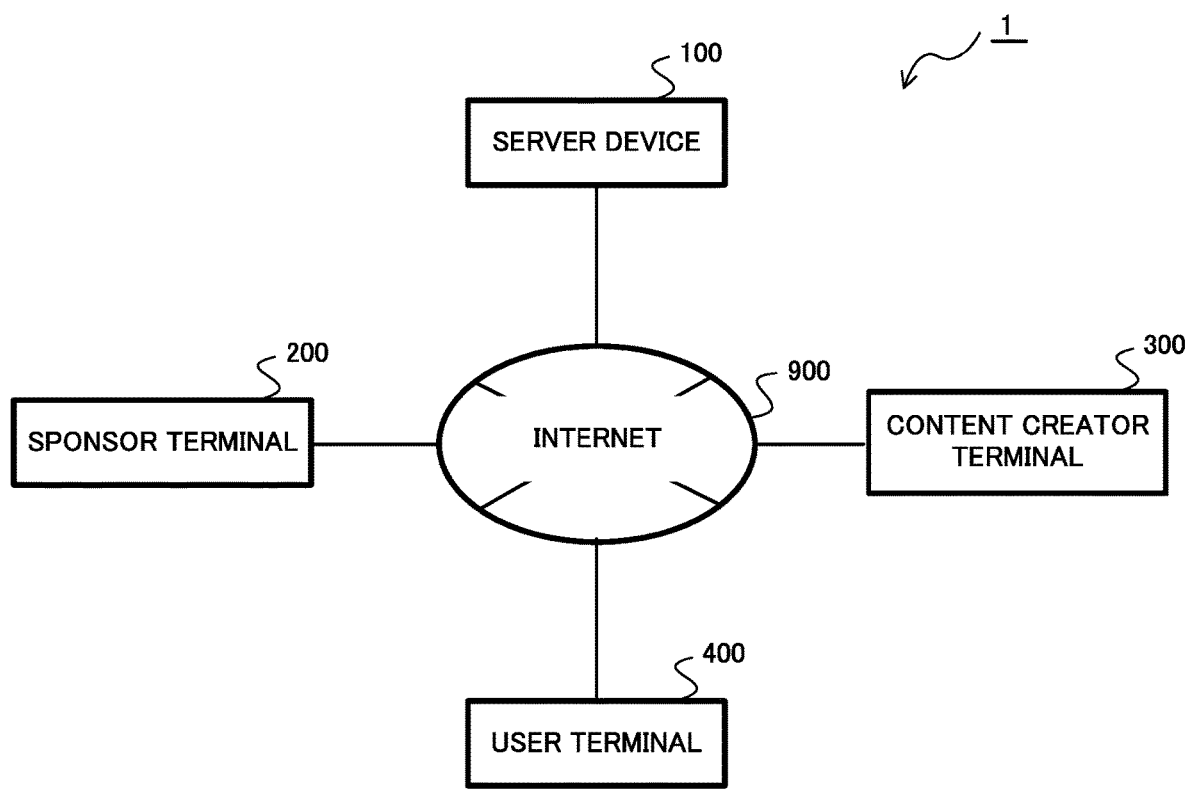
FIG. 1 is a schematic drawing illustrating an example of the overall configuration of a matching system according to an embodiment.

Hereinafter, embodiments of the present disclosure are described in detail while referencing the drawings. Note that, in the drawings, identical or corresponding components are denoted with the same reference numerals. In the following, a description is given in which an external service to which a content creator posts content is referred to as a first service, and a sales service affiliated with the matching system is referred to as a second service. The term "product" (product or the like to be promoted) as used hereinafter includes not only physical products, but also electronic products (for example, electronic money, software such as games sold as downloads and usage rights thereof, electronic items, and the like). That is, the following embodiments are presented for the purpose of explanation and should not be construed as limiting the scope of the invention of the present disclosure. Accordingly, embodiments in which some elements or all elements of these embodiments are replaced with equivalent elements by one skilled in the art can also be employed, and such embodiments are also included within the scope of the present disclosure.

Embodiment 1

FIG. 1 is a schematic drawing illustrating an example of the overall configuration of a matching system 1 according to Embodiment 1 of the present disclosure. In one example, in this matching system 1, a server device 100 that assists matching of a sponsor and a content creator, a sponsor terminal 200 used by the sponsor, a content creator terminal 300 used by a content creator that posts content to an external service (first service), and a user terminal 400 used by a user and that is capable of browsing (including viewing and the like) the content posted by the content creator are communicably connected via an internet 900. Note that the user that uses the user terminal 400 also includes users that use a sales service (second service) affiliated with the matching system 1. Additionally, in FIG. 1, one each of the sponsor terminal 200, the content creator terminal 300, and the user terminal 400 are illustrated but, in reality, multiple units of the sponsor terminal 200, the content creator terminal 300, and the user terminal 400 exist.

In one example, the server device 100 is implemented as a server computer or the like, and assists matching of the sponsor and the content creator.

Note that, in one example, the server device 100 can exchange information with a non-illustrated sales server that manages the affiliated sales service (second service), and the hereinafter described information about a target user, information about a product that the user purchases via the sales service, and the like can be acquired from the sales server In one example, the sponsor terminal 200 is implemented as a personal computer (PC), a smartphone, a tablet, or a similar terminal, and is used by the sponsor that desires to request, to a desired content creator, the promotion of a product or service that is a promotion target.

In one example, the content creator terminal 300 is implemented as a PC, a smartphone, a tablet, or a similar terminal, and is used by the content creator that posts content to an external service (first service) such as a video posting service, an SNS, or a blog.

In one example, the user terminal 400 is implemented as a PC, a smartphone, a tablet, or a similar terminal, and is used by a user that views or browses the content posted to the first service by the content creator. Note that the user that uses the user terminal 400 also includes users that use the affiliated sales service (second service). That is, the user that uses the user terminal 400 also includes users that have an account with the first service and also have an account with the second service.

Overview of Configuration of Information Processing Device 500

Next, a description is given of a typical information processing device 500 in which the server device 100, the sponsor terminal 200, the content creator terminal 300, and the user terminal 400 according to Embodiment 1 are realized.

Figure 2:
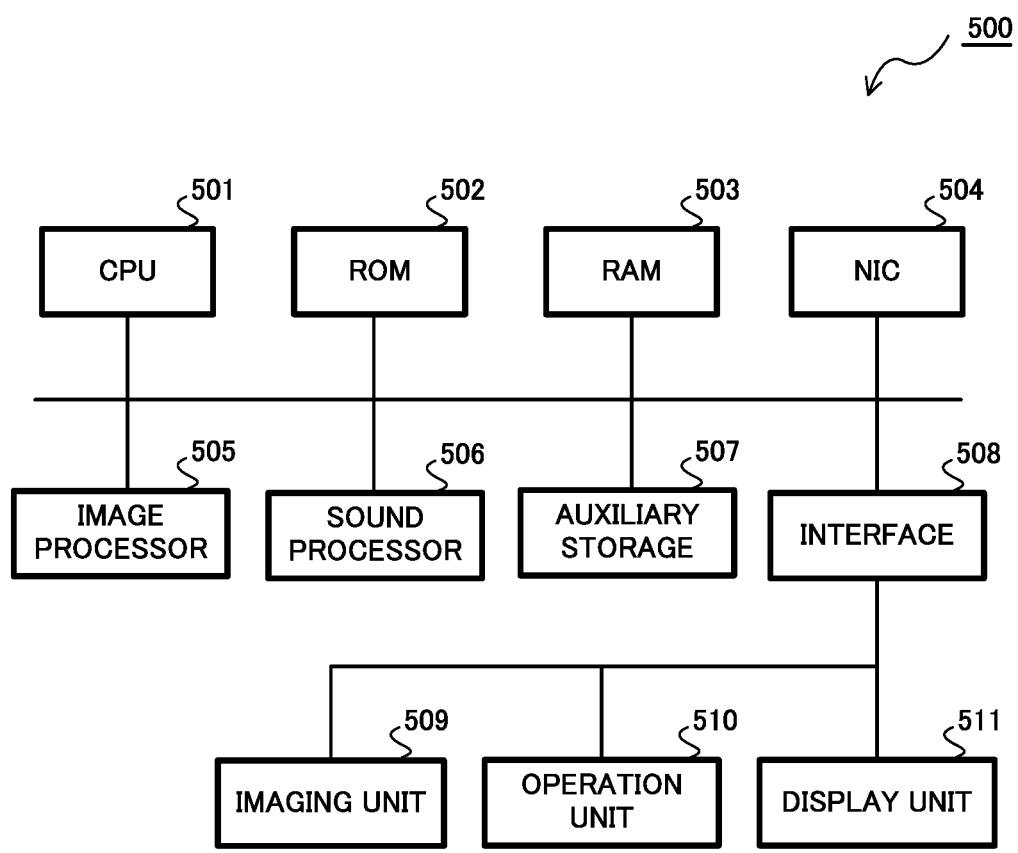
FIG. 2 is a block diagram illustrating an example of an overview of the configuration of a typical information processing device in which a server device and the like are realized.

As illustrated in FIG. 2, the information processing device 500 includes a central processing unit (CPU) 501, a read-only memory (ROM) 502, a random access memory (RAM) 503, a network interface card (NIC) 504, an image processor 505, a sound processor 506, an auxiliary storage 507, an interface 508, an imaging unit 509, an operation unit 510, and a display unit 511.

The CPU 501 controls the operations of the entire information processing device 500, and is connected to and exchanges control signals and data with the various components.

An initial program loader (IPL) executed immediately after the power is turned ON is stored in the ROM 502 and, by executing the IPL, a program stored in the auxiliary storage 507 is read out to the RAM 503 and execution, by the CPU 501, of that program is started.

The RAM 503 is a component for temporarily storing data and programs. The program and data read from the auxiliary storage 507 and, also, data and the like needed for communication are held in the RAM 503.

The NIC 504 is a component for connecting the information processing device 500 to a computer communication network such as the internet or the like, and is constituted by a component compliant with 10BASE-T/100BASE-T standards used when constructing a local area network (LAN), an analog modem, an integrated services digital network (ISDN) modem, or an asymmetric digital subscriber line (ADSL) modem for connecting to the internet using a phone line, a cable modem for connecting to the internet using a cable television line, or the like.

The image processor 505 processes, by the CPU 501 and/or an image calculation processor (not illustrated) of the image processor 505, image data read out from the auxiliary storage 507 or the like and, then, records the processed image data in a frame memory (non-illustrated) of the image processor 505. The image information recorded in the frame memory is converted to a video signal at a predetermined synchronization timing, and is output to the display unit 511 via the interface 508 or the like. That is, under the control of the CPU 501, the image processor 505 generates an image that becomes needed during the progress of the processing performed by the information processing device 500, and displays that image on the display unit 511.

The sound processor 506 converts music data and sound data read out from the auxiliary storage 507 or the like to sound signals, and outputs the sound signals out via the interface 508 and the like. Note that when the information processing device 500 includes a speaker therein, the sound processor 506 outputs the converted sound signals to the speaker. That is, under the control of the CPU 501, the sound processor 506 generates music sounds and/or sounds to be emitted during the progress of the processing performed by the information processing device 500, and outputs the music sounds or the like from an internal or external speaker.

The auxiliary storage 507 is implemented as a hard disk, a solid state drive (SSD), or the like, and stores various types of programs and various types of data needed for the operation control of the entire information processing device 500. For example, a program for realizing the server device 100 and the like according to some embodiments is stored in the auxiliary storage 507. Moreover, as a result of the control of the CPU 501, the auxiliary storage 507 appropriately reads out the stored programs and data and temporarily stores these in the RAM 503 or the like.

In one example, the interface 508 is compliant with a standard such as HDMI (registered trademark), universal serial bus (USB), inter-integrated circuit (I2C), or the like, and the imaging unit 509, the operation unit 510, and the display unit 511 are connected to the interface 508. Note that a configuration is possible in which the interface 508 sends and receives necessary information to and from a separately connected external device in addition to the components described above.

In one example, the imaging unit 509 is implemented as a single-focus lens, and an imaging element having a predetermined number of pixels (Complementary Metal Oxide Semiconductor (CMOS) or Charge Coupled Device (CCD)), and captures still images or videos.

The operation unit 510 receives operation inputs of a worker or the like that uses the information processing device 500.

The display unit 511 draws an image corresponding to the image data output by the image processor 505, and presents the drawn image to the worker that uses the information processing device 500.

In addition, a configuration is possible in which the information processing device 500 includes a drive unit for a digital versatile disc (DVD)-ROM or the like instead of the auxiliary storage 507. In such a case, the information processing device 500 reads out the program and/or the data from a DVD-ROM or the like mounted in the drive unit, and operates as described above.

Next, the functions and the like of the server device 100 realized in the information processing device 500 described above are described while referencing FIGS. 3 to 8. When the power of the information processing device 500 is turned ON, a program that causes the information processing device 500 to function as the server device 100 according to Embodiment 1 is executed, and the server device 100 according to Embodiment 1 is realized. Note that the sponsor terminal 200, the content creator terminal 300, and the user terminal 400 are also realized by the information processing device 500, but descriptions thereof are foregone here, and the server device 100, which is the most characteristic constituent of the present embodiment is described below.

Functional Configuration of Server Device 100

Figure 3:
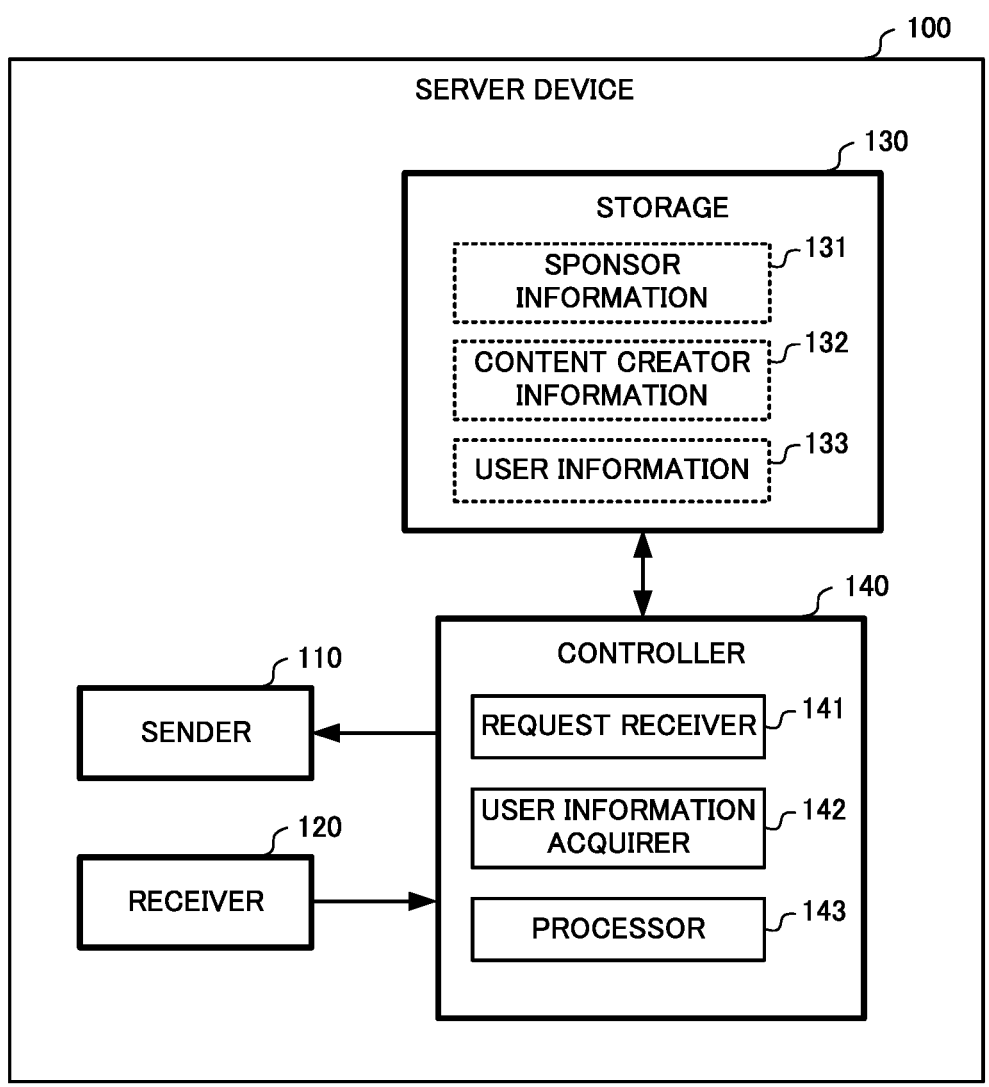
FIG. 3 is a block diagram illustrating the functional configuration of the server device according to Embodiment 1.

FIG. 3 is a block diagram illustrating an example of the functional configuration of the server device 100 according to Embodiment 1. As illustrated in FIG. 3, the server device 100 includes a sender 110, a receiver 120, a storage 130, and a controller 140.

The sender 110 sends, via the internet 900, various types of information directed to the sponsor terminal 200, the content creator terminal 300, and the like. For example, the sender 110 is controlled by the controller 140 (processor 143, described later) and sends, to the sponsor terminal 200, a candidate list (candidate lists CL1, CL2, described later) of content creators. Additionally, the sender 110 sends, to the content creator terminal 300, link information whereby the content creator can be identified, and requests that the content creator set the link information in the content to be posted to the first service.

Note that the NIC 504 described above can function as such a sender 110.

The receiver 120 receives various types of information sent via the internet 900 from the sponsor terminal 200, the content creator terminal 300, and the like. For example, the receiver 120 receives request information (more specifically, as described later, request information that includes a category or the like of the promotion target, and that is for requesting promotion of the promotion target to a desired content creator) sent from the sponsor terminal 200.

Note that the NIC 504 described above can function as such a receiver 120.

The storage 130 stores various types of information needed for the processing of the server device 100. For example, the storage 130 stores sponsor information 131, content creator information 132, and user information 133.

The sponsor information 131 is information for managing the sponsor that uses the sponsor terminal 200 and, in one example, includes information such as illustrated in FIG. 4. Specifically, the sponsor information 131 includes information such as a sponsor ID 131*a*, a sponsor name 131*b*, an offered product/service 131*c*, a promotion target 131*d*, and the like. Note that, as an example, the name of the promotion target (product or service) that the sponsor desires to promote is illustrated as the promotion target 131*d*, but a configuration is possible in which the promotion target is a category to which that product or service belongs.

Returning to FIG. 3, the content creator information 132 is information for managing the content creator that uses the content creator terminal 300 and, in one example, includes information such as illustrated in FIG. 5. Specifically, the content creator information 132 includes information such as a content creator ID 132*a*, a handle name 132*b*, a platform 132*c*, a number of registered users 132*d*, and the like. Note that, as an example, the content creator ID 132*a* is identification information of the matching system 1 (as described later, identification information from when an account is issued to the content creator), but a configuration is possible in which the content creator ID 132*a* is identification information of the first service. Additionally, the platform 132*c* indicates the external service (the first service) to which the content creator posts content. Moreover, the number of registered users 132*d* indicates a number of users (number of followers, or the like for SNS) on the platform 132*c* that have added the content creator to their favorites.

Figure 6:
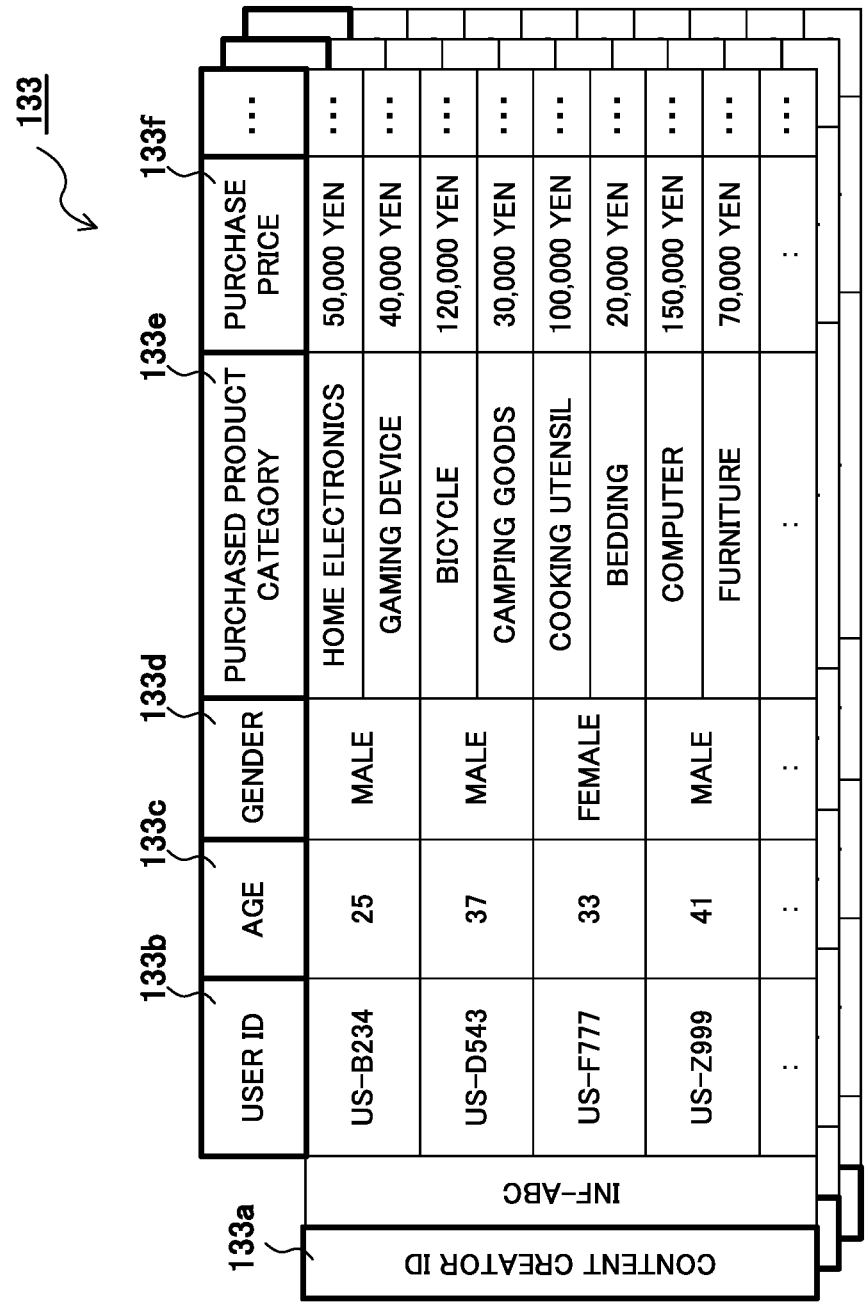
FIG. 6 is a schematic drawing illustrating an example of user information.

Returning to FIG. 3, the user information 133 is user information about a target user acquired by a user information acquirer 142, described later, and, as an example, includes information such as illustrated in FIG. 6. Note that the target user is a user that has an account with the first service, and also, among users that have accessed the second service via link information set in the content that the content creator has posted, has an account with the second service.

As illustrated in FIG. 6, the user information 133 includes information such as a content creator ID 133*a*, a user ID 133*b*, an age 133*c*, a gender 133*d*, a purchased product category 133*e*, a purchase price 133*f*, and the like. Note that the content creator ID 133*a* is identification information of the content creator that posts the content that the user views (browses). The user ID 133*b* is identification information of the second service. The purchased product category 133*e* indicates the category of the product purchased by the user on the affiliated sales service (the second service). The purchase price 133*f* indicates the price of the product purchased by the user.

Note that the user information 133 described above is an example, and a configuration is possible in which the user information 133 further includes salary information, vehicle ownership information, bank account information, insurance enrollment information, securities account information, and the like.

In addition, the storage 130 stores various types of information needed for the processing of the controller 140. For example, the storage 130 also stores the link information and the like sent to the content creator terminal 300.

Note that the auxiliary storage 507 and the like described above can also function as such a storage 130.

Returning to FIG. 3, the controller 140 controls the entire server device 100. In one example, the controller 140 includes a request receiver 141, a user information acquirer 142, and a processor 143.

The request receiver 141 receives, through the receiver 120, a promotion request for the promotion target (product or service) sent from the sponsor terminal 200. In one example, the promotion request includes the category to which the promotion target belongs or information for identifying that category.

The user information acquirer 142 acquires the user information about a target user, among users that have accessed the second service via the link information set in the content that the content creator has posted to the first service, that has an account with the second service. Note that the user need not have an account with the first service.

In one example, the user information acquirer 142 identifies, on the basis of information obtained when the affiliate sales server is accessed via the link information and for each of a plurality of content creators, correspondence between the content creator and the target user, and acquires the user information associated with each of the content creators. Specifically, the user information acquirer 142 acquires, from the affiliated sales server, user information 133 such as illustrated in FIG. 6, and stores the acquired user information 133 in the storage 130.

The processor 143 uses the user information acquired by the user information acquirer 142 to perform processing for assisting matching of the sponsor and the content creator. In one example, the processor 143 selects, on the basis of processing results obtained by performing statistical processing on the user information associated with each of the plurality of content creators, a vendor candidate, from among the plurality of content creators, to which promotion is to be requested. Specifically, a configuration is possible in which the processor 143 performs statistical processing in accordance with the promotion target that the sponsor desires to promote, and selects, based on the obtained processing results, the vendor candidate to which promotion of the promotion target is to be requested. Additionally, a configuration is possible in which, in the statistical processing, the processor 143 derives a score value on the basis of a plurality of statistical values, and selects the vendor candidate in accordance with the derived score value. Note that specific examples of the statistical values include an average purchase count, a paid amount, a number of purchases, and a number of users per month after member registration, or combinations thereof, and the score value may be derived on the basis of these values. In addition, the score value may be derived on the basis of statistical values such as a purchase count and a number of purchases in a target category, or the like.

As a result, it is possible to present a more suitable content creator to the sponsor.

Figure 7:
FIG. 7 is a schematic drawing illustrating an example of a candidate list.
Figure 8:
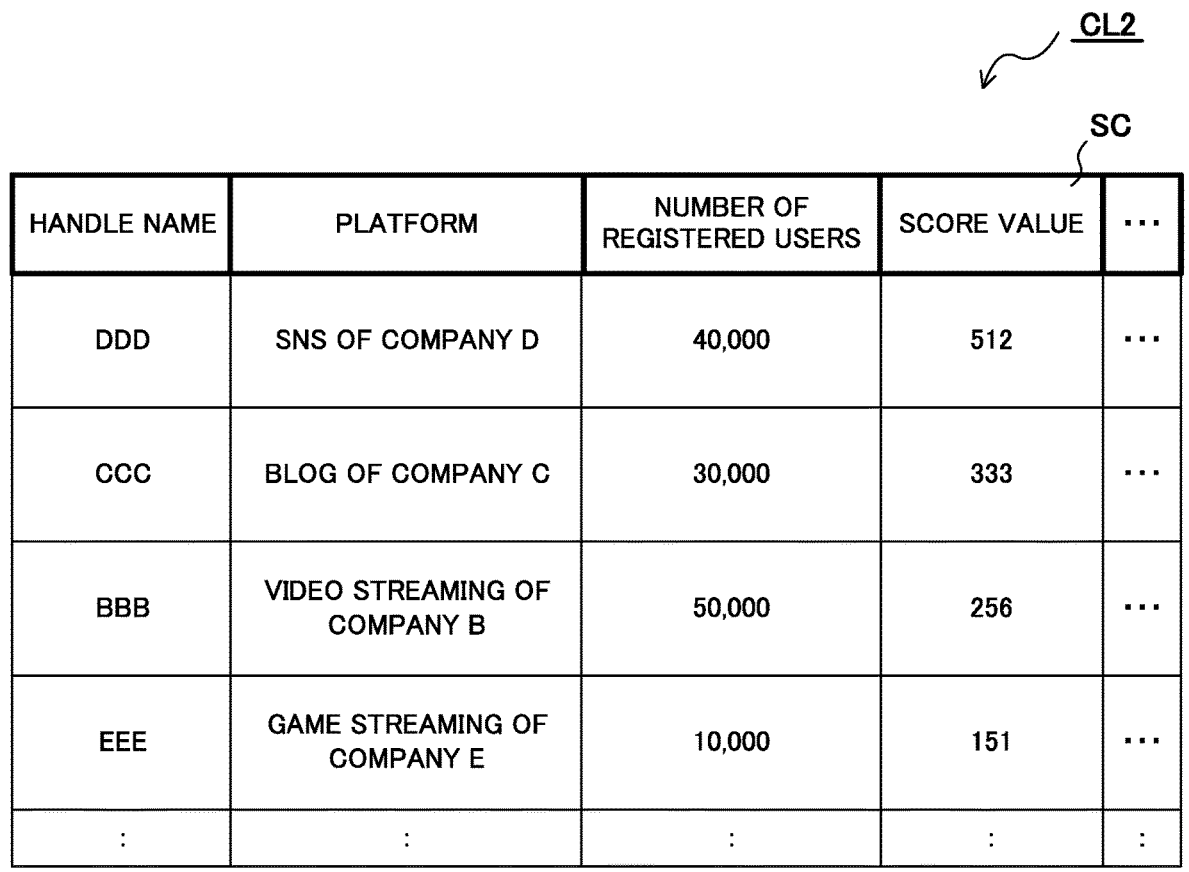
FIG. 8 is a schematic drawing illustrating an example of another candidate list.

More specifically, the processor 143 generates a candidate list CL1 including a score value SC, such as illustrated in FIG. 7. In one example, this candidate list CL1 is a list in which only content creators that have a score value SC that exceeds a reference value are selected as vendor candidates. In addition, a configuration is possible in which the processor 143 generates a candidate list CL2 that is sorted on the basis of the score value SC, such as illustrated in FIG. 8.

The processor 143 controls the sender 110 to send the candidate list (candidate list CL1, CL2) generated as described above to the sponsor terminal 200 that receives the promotion request by the request receiver 141.

As a result, it is possible to present a more suitable content creator to the sponsor.

In addition, the processor 143 generates link information whereby the content creator can be identified. In one example, the processor 143 generates link information that includes the identification information (the content creator ID) of the content creator, and that causes a transition to the affiliated sales server (the second system). Note that a configuration is possible in which the link information causes a transition to the matching system 1 instead of to the sales server. Next, the processor 143 sends the generated link information to the content creator terminal 300 and requests the content creator to set the link information in the content to be posted to the first system.

The CPU 501 and the like can function as the controller 140 configured as described above.

Operations of Server Device 100

Figure 9:
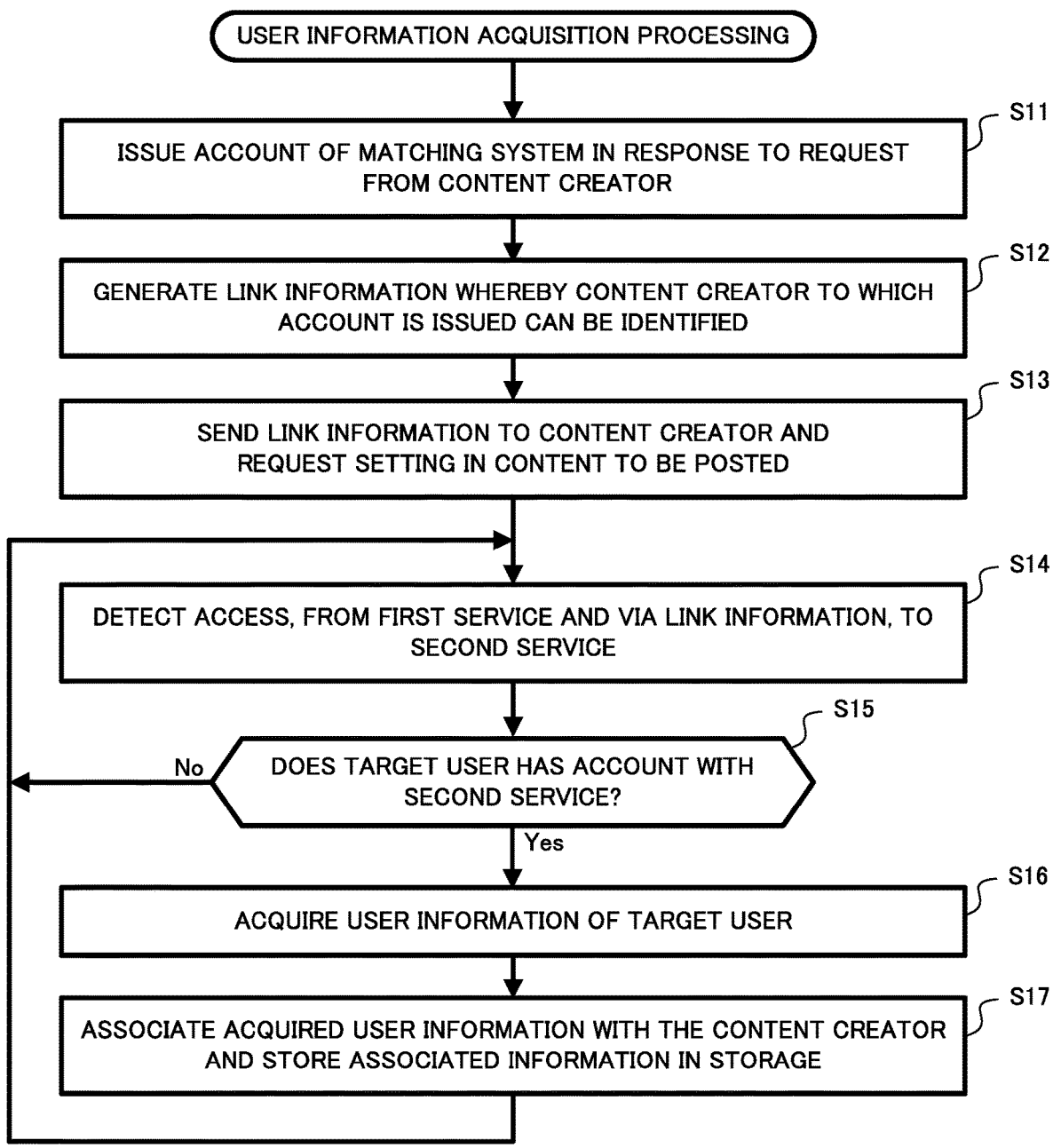
FIG. 9 is a flowchart for explaining user information acquisition processing according to Embodiment 1.
Figure 10:
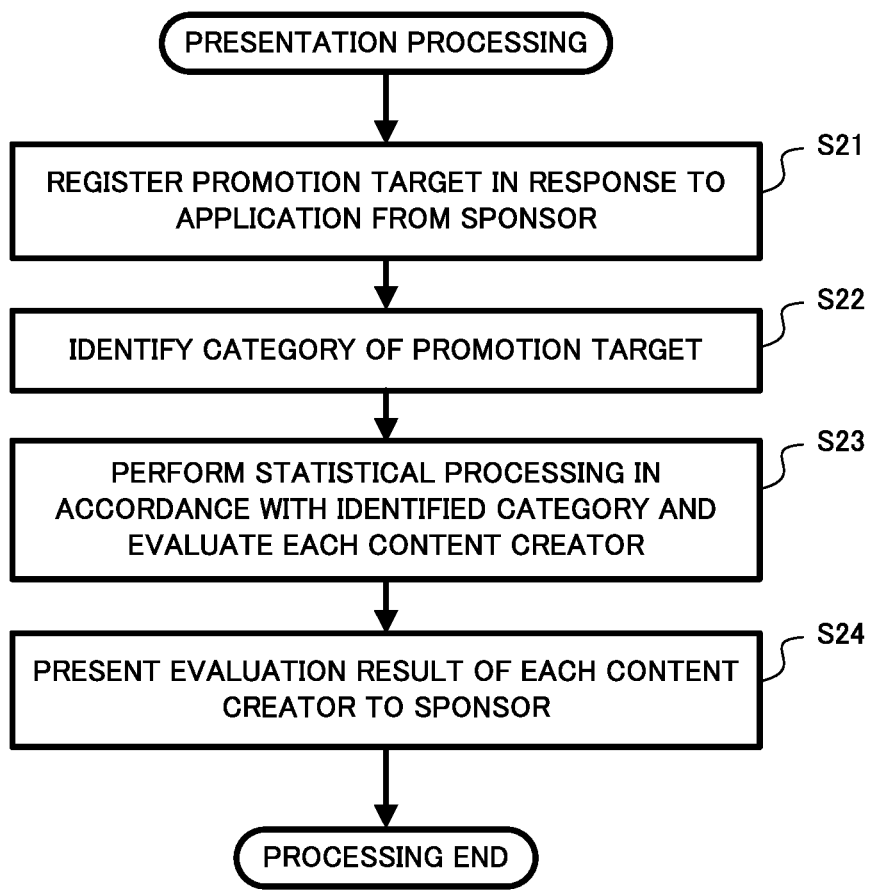
FIG. 10 is a flowchart for explaining presentation processing according to Embodiment 1.

Hereinafter, the operations of the server device 100 are described while referencing FIGS. 9 and 10. FIG. 9 is a flowchart for explaining user information acquisition processing according to Embodiment 1. FIG. 10 is a flowchart for explaining presentation processing according to Embodiment 1.

First, the user information acquisition processing of FIG. 9 is described. In one example, the user information acquisition processing is executed in the server device 100 upon a request for account registration being sent from the content creator terminal 300.

Firstly, the server device 100 issues an account of the matching system 1 in response to the request from the content creator (step S11).

That is, the controller 140 issues an account of the matching system 1 when a request for account registration is sent from the content creator terminal 300. Note that a configuration is possible in which the controller 140 issues an account of the affiliated sales server instead of an account of the matching system 1.

The server device 100 generates link information whereby the content creator to which the account is issued can be identified (step S12).

In one example, the controller 140 (the processor 143) generates link information that includes the identification information (the content creator ID) of the content creator, and that causes a transition to the affiliated sales server (the second system). Note that a configuration is possible in which the link information causes a transition to the matching system 1 instead of to the sales server.

The server device 100 sends the link information to the content creator and requests that the link information be set in the content to be posted (step S13).

That is, the controller 140 (the processor 143) sends the link information generated in step S12 to the content creator terminal 300, and requests that the content creator set the link information in the content to be posted to the first service.

In one example, the content creator inserts the link information into the summary field, the body text, or the like of the content, and posts to the first service. Then, when a user that views (browses) the content presses, or the like, the set link information, that user is transitioned to the affiliated sales server (the second system) in accordance with the link information.

The server device 100 detects an access to the second service from the first service, via the link information (step S14).

In one example, the controller 140 (the user information acquirer 142) analyzes access information sent from the affiliated sales server, and detects an access via the link information to the second service.

The server device 100 determines whether the access is by a user is a target user. Here, the target user is a user that has an account with the second service (step S15).

In one example, the controller 140 (the user information acquirer 142) determines that the user is a target user when the user logged into the affiliated sales server (the second system) accesses the second service via the link information. In addition, a configuration is possible in which the server device 100 determines whether the user is a target user using a cookie or a conversion API (CAPI).

When the server device 100 determines that the user is not a target user (step S15; No), the server device 100 executes the processing of step S14. That is, the server device 100 detects the next access (access to the second service via the link information).

Meanwhile, when the user is a target user (step S15; Yes), the server device 100 acquires the user information of the target user (step S16).

In one example, the controller 140 (the user information acquirer 142) acquires, from the affiliated sales server (the second service), age information, gender information, purchase history information, and the like of the target user. Note that a configuration is possible in which the controller 140 also acquires, from the sales server, salary information, vehicle ownership information, bank account information, insurance enrollment information, securities account information, and the like.

The server device 100 associates the acquired user information with the content creator and stores the associated information in the storage 130 (step S17).

In one example, the controller 140 (the user information acquirer 142) stores user information 133 such as that illustrated in FIG. 6 in the storage 130. In this user information 133, the user information of the target user acquired in step S16 is associated with each content creator.

As a result of the user information acquisition processing described above, user information 133 such as illustrated in FIG. 6 is created and stored in the storage 130. That is, the user information of the target user associated with each content creator is accumulated daily, and stored in the storage 130.

Next, the presentation processing of FIG. 10 is described. In one example, the presentation processing is executed in the server device 100 when an application of a promotion target is made from the sponsor terminal 200 in a state in which the user information acquisition processing described above has been performed and user information 133 such as illustrated in FIG. 6 is stored in the storage 130.

Firstly, the server device 100 registers the promotion target in accordance with the application from the sponsor (step S21).

That is, the controller 140 (the request receiver 141) registers the promotion target in accordance with a promotion request for the promotion target (product or service) sent from the sponsor terminal 200.

The server device 100 identifies the category of the promotion target (step S22).

In one example, the controller 140 (the request receiver 141) identifies the category to which the promotion target belongs from the name and/or description of the promotion target.

The server device 100 performs statistical processing in accordance with the identified category and evaluates each content creator (step S23).

In one example, the controller 140 (the processor 143) tallies a degree of similarity between the purchased product category 133e included in the user information 133 such as illustrated in FIG. 6 and the category of the promotion target identified in step S22, and derives a score value, corresponding to the promotion target, of each content creator.

The server device 100 presents, to the sponsor, the evaluation result of each content creator (step S24).

In one example, the controller 140 (the processor 143) generates the candidate list CL1 including score values SC such as illustrated in FIG. 7 and/or the candidate list CL2 sorted on the basis of the score values SC such as illustrated in FIG. 8, and presents the candidate list CL1 and/or the candidate list CL2 to the sponsor terminal 200.

As a result of the presentation processing, candidate lists CL1 and CL2 such as illustrated in FIGS. 7 and 8 are presented to the sponsor terminal 200. These candidate lists CL1 and CL2 include the score value SC, corresponding to the promotion target, of each content creator. As such, the sponsor is enabled to select, on the basis of the score value SC, the content creator suited to the promotion target for which promotion is being requested.

As a result, it is possible to present a more suitable content creator to the sponsor.

Embodiment 2

In Embodiment 1, a case is described in which all of the content creators that have an account registered with the matching system 1 are considered, and a vendor candidate extracted from among all of the content creators is presented. However, a configuration is possible in which each content creator can bid on the promotion request from the sponsor, and a vendor candidate extracted from among the bidding content creators is presented.

Hereinafter, Embodiment 2 is described. Embodiment 2 is characterized in that each content creator bids on the promotion request from the sponsor.

Figure 11:
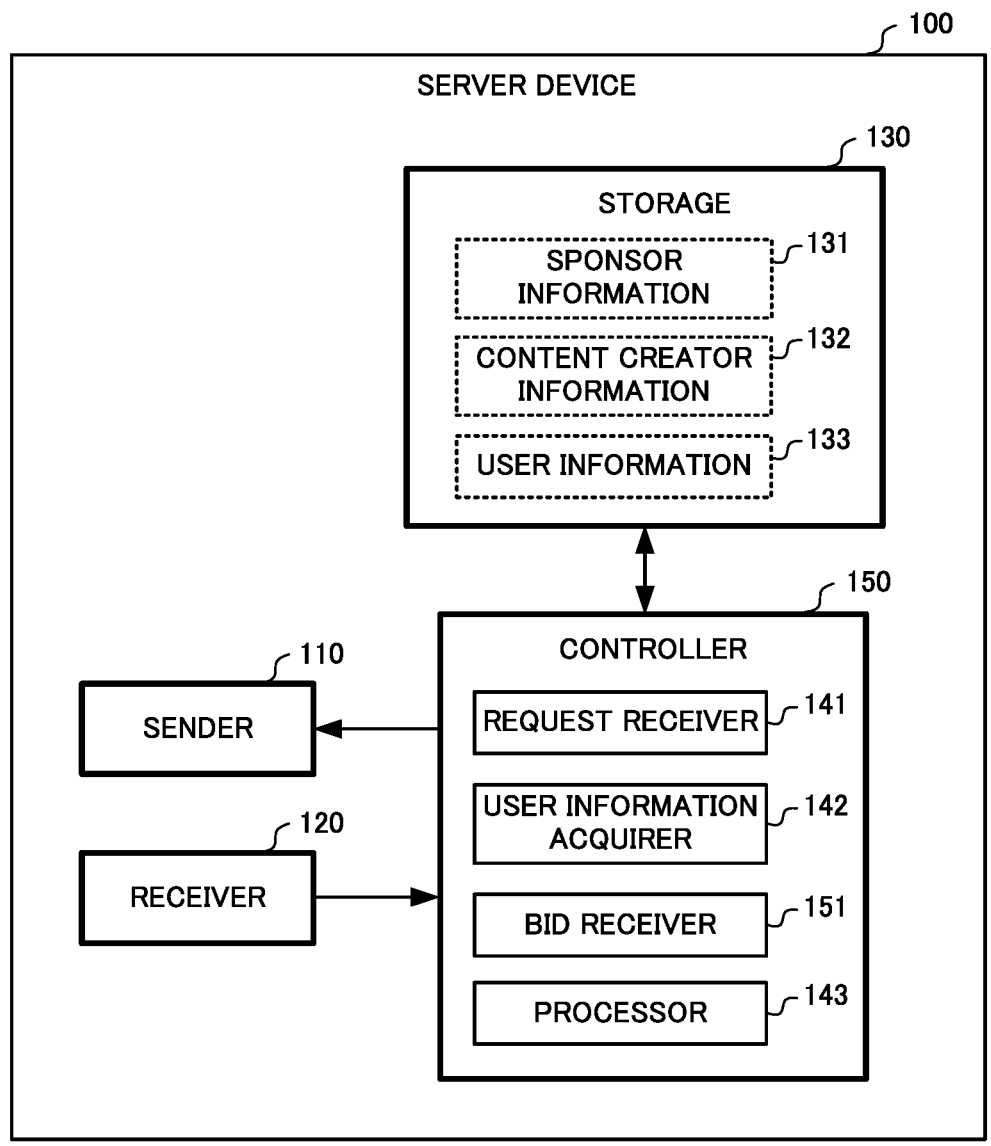
FIG. 11 is a block diagram illustrating the functional configuration of a server device according to Embodiment 2.

FIG. 11 is a block diagram illustrating an example of the functional configuration of the server device 100 according to Embodiment 2. As illustrated in FIG. 11, the server device 100 includes a sender 110, a receiver 120, a storage 130, and a controller 150. Note that the configurations of the sender 110, the receiver 120, and the storage 130 are the same as those of the server device 100 of FIG. 3 described above.

The controller 150 controls the entire server device 100. In one example, the controller 150 includes a request receiver 141, a user information acquirer 142, a bid receiver 151, and a processor 143. Note that the configurations of the request receiver 141, the user information acquirer 142, and the processor 143 are the same as those of the controller 140 of the server device 100 of FIG. 3 described above.

The bid receiver 151 receives bids from each of a plurality of content creators in accordance with a promotion request from a sponsor.

In one example, the bid receiver 151 notifies each content creator of the promotion request from the sponsor, and receives bids from each of the content creators up to a predetermined bidding deadline.

Figure 12:
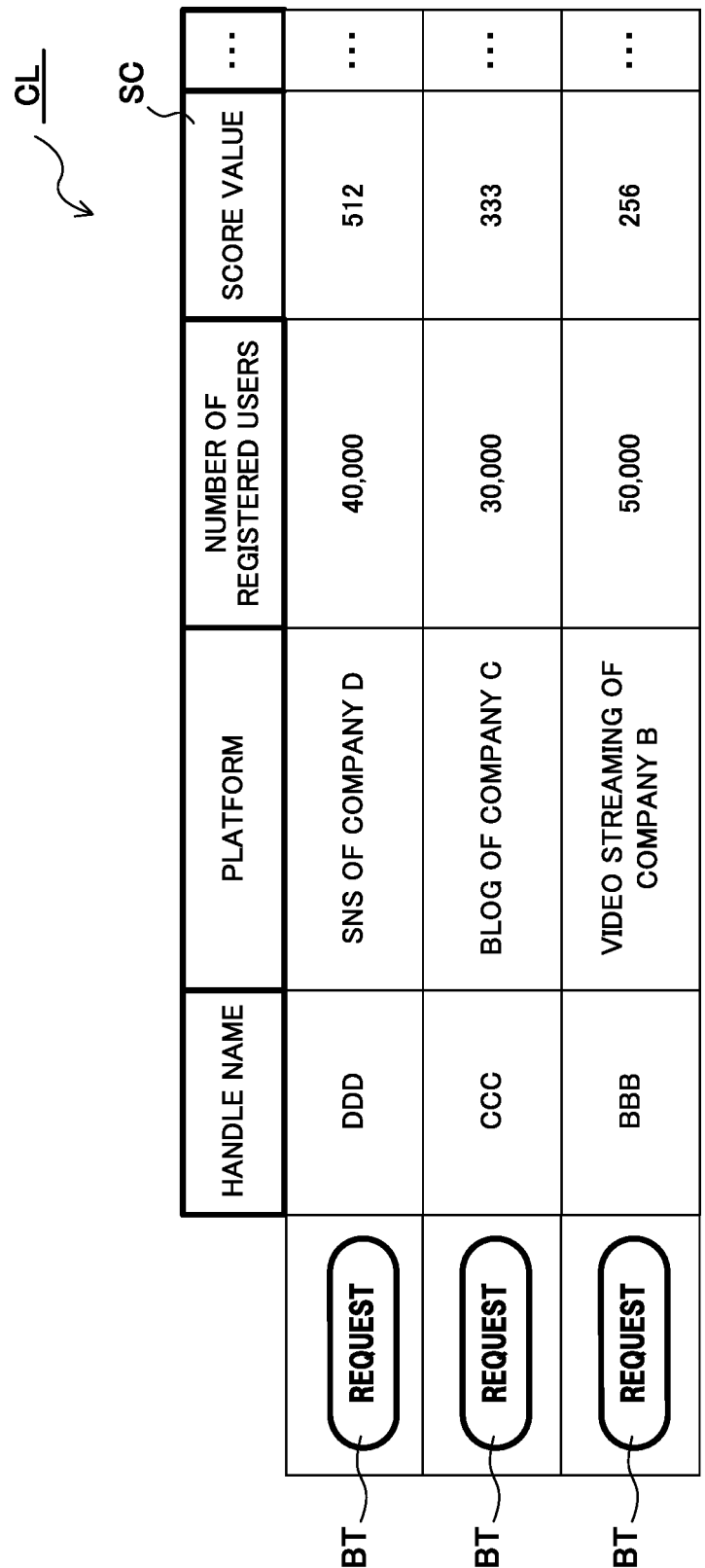
FIG. 12 is a schematic drawing illustrating an example of a proposal list.

Note that the processor 143 selects the vendor candidate on the basis of the processing results for each of the content creators that enters a bid. In one example, the processor 143 generates a proposal list SL including score values SC and selection buttons BT such as illustrated in FIG. 12. In one example, this proposal list SL is a list in which, of the bidding content creators, the three content creators with the highest score value SC are selected as vendor candidates. Then, since the vendor candidates are selected from among the bidding content creators, the sponsor simply presses one of the selection buttons BT and the promotion request is sent to that content creator.

As a result, it is possible to present a more suitable content creator to the sponsor.

Hereinafter, the operations of the server device 100 of Embodiment 2 are described while referencing FIG. 13. FIG. 13 is a flowchart for explaining proposal processing according to Embodiment 2. In one example, the proposal processing is executed in the server device 100 when an application of a promotion target is made from the sponsor terminal 200 in a state in which the user information acquisition processing described above is performed and user information 133 such as illustrated in FIG. 6 is stored in the storage 130.

Firstly, the server device 100 registers the promotion target in response to the application from the sponsor (step S31).

That is, the controller 140 (the request receiver 141) registers the promotion target in response to a promotion request for the promotion target (product or service) sent from the sponsor terminal 200.

The server device 100 identifies the category of the promotion target (step S32). In one example, the controller 140 (the request receiver 141) identifies the category to which the promotion target belongs from the name and/or description of the promotion target.

The server device 100 notifies each content creator about bidding (step S33).

In one example, the controller 140 (the bid receiver 151) uses an email, a push notification, a bulletin board, or the like to notify each content creator of bidding details, including the promotion target.

The server device 100 receives bids from each content creator (step S34).

In one example, the controller 140 (the bid receiver 151) receives bids from each of the content creators up to the predetermined bidding deadline.

The server device 100 evaluates each bidding content creator in accordance with the identified category (step S35).

In one example, the controller 140 (the processor 143) tallies, for each bidding content creator in the user information 133 such as illustrated in FIG. 6, a degree of similarity between the purchased product category 133e and the category of the promotion target identified in step S22, and derives a score value, corresponding to the promotion target, of each content creator.

The server device 100 proposes, to the sponsor, a vendor candidate determined on the basis of the evaluation results (step S36).

In one example, the controller 140 (the processor 143) generates and presents, to the sponsor terminal 200, a proposal list SL including score values SC and selection buttons BT, such as illustrated in FIG. 12.

The server device 100 determines whether there is a selection of a vendor candidate by the sponsor (step S37).

That is, the controller 140 (the processor 143) determines whether one of the selection buttons BT is pressed in a state in which the proposal list SL such as illustrated in FIG. 12 is presented to the sponsor terminal 200.

When the server device 100 determines that there is no selection of a vendor candidate (step S37; No), the proposal processing is ended.

Note that a determination that there is no selection of a vendor candidate is made when, for example, the proposal list SL is closed without a selection button BT being pressed.

Meanwhile, when the server device 100 determines that there is a selection of a vendor candidate (step S37; Yes), the server device 100 sends the promotion request from the sponsor to the content creator of the selected vendor candidate.

That is, the controller 140 (the processor 143) sends the promotion request from the sponsor to the target content creator terminal 300.

As a result of the proposal processing, a proposal list SL such as illustrated in FIG. 12 is presented to the sponsor terminal 200. The proposal list SL includes the score value SC, corresponding to the promotion target, of each content creator. As such, the sponsor is enabled to select, on the basis of the score values SC, the content creator suited to the promotion target for which promotion is being requested. Moreover, since the proposal list SL includes the selection buttons BT and the promotion request is sent to the corresponding content creator by the sponsor simply pressing one of the selection buttons BT, it is possible to quickly request promotion to a content creator suited to the promotion target.

As a result, it is possible to present a more suitable content creator to the sponsor.

Other Embodiments

In Embodiments 1 and 2, a case is described in which the server device 100 acquires the user information of the target user from the affiliated sales server (the second service), but a configuration is possible in which the server device 100 also manages the sales service and acquires the user information of the target user from a database or the like of the server device 100.

In Embodiments 1 and 2, a sales service is described as the second service but, in addition to the sales service, a configuration is possible in which another service, from which user information that can be subjected to statistical processing can be acquired, is used as the second service. For example, a point of service (point system) and/or a payment service may be used as the second service.

In Embodiments 1 and 2, external services to which the content creator posts content are described collectively as the first service. However, among content creators, there are many content creators that post content to different external services. As such, a configuration is possible in which a plurality of first services are linked to each content creator to manage the content creators and, also, the user information of the target user can be acquired from among a wide range of users that use each of the first services.

In Embodiments 1 and 2, the program to be executed by the server device 100 or the like can be stored and distributed on a non-transitory computer-readable recording medium such as a compact disc read only memory (CD-ROM), a digital versatile disc (DVD), a magneto-optical (MO) disk, a USB memory, a memory card, or the like. Moreover, it is possible install this program on a specific or general purpose computer, thereby causing that computer to function as the server device 100 of Embodiment 1 or 2.

A configuration is possible in which the program described above is stored on a disc device of a server device on a communication network such as the internet, and is downloaded to a computer by being superimposed on a carrier wave, for example. The processing described above can also be achieved by starting up and executing the program while transferring the program via the communication network. Furthermore, the processing described above can also be achieved by causing a portion or the entirety of the program to be executed on a server device, and executing the program while the computer sends and receives information related to the processing of the program via the communication network.

Note that, in cases in which the functions described above are realized in part by an operating system (OS), or the functions are realized by cooperation between an OS and an application, it is possible to store and distribute only the portion other than the OS on the non-transitory recording medium, or download the portion other than the OS to a computer.

[1] A server device including:
- a user information acquirer that acquires user information about a target user, among users that have accessed a second service via link information set in content that a content creator posts to a first service, that has an account with the second service; and
- a processor that uses the user information to perform processing for assisting matching of a sponsor and the content creator.

[2] The server device according to [1], wherein the user information acquirer identifies, based on information obtained when the second service is accessed via the link information and for each of a plurality of the content creator, correspondence between the content creator and the target user, and acquires the user information associated with each of the content creator.

[3] The server device according to [2], wherein the processor selects, based on processing results obtained by performing statistical processing on the user information associated with each of the plurality of the content creator and from among the plurality of the content creator, a vendor candidate to which promoting is to be requested.

[4] The server device according to [3], wherein the processor performs statistical processing in accordance with a product or a service, that is a promotion target, that a sponsor desires to promote, and selects, based on the obtained processing results, the vendor candidate to which promoting of the promotion target is to be requested.

[5] The server device according to [3] or [4], wherein the processor, in the statistical processing, derives, based on a plurality of statistical values, a score value, and selects the vendor candidate in accordance with the derived score value.

[6] The server device according to any one of [3] to [5], wherein the processor sorts, based on the processing results, a list of the vendor candidate in which a plurality of the content creator is included.

[7] The server device according to any one of [4] to [6], further including a request receiver that receives, from the sponsor, a promotion request including a category to which the promotion target belongs or information for identifying the category, wherein the processor performs the statistical processing in accordance with the category, and selects, based on the processing results, the vendor candidate.

[8] The server device according to any one of [1] to [7], wherein the user information acquirer acquires the user information that includes at least any one among age information, gender information, salary information, vehicle ownership information, bank account information, insurance enrollment information, securities account information, and purchase history information.

[9] The server device according to any one of [3] to [7], further including a bid receiver that receives a bid from each content creator of the plurality of content creators, wherein the processor selects, based on the processing results for each content creator of the plurality of content creators that enters the bid, the vendor candidate.

[10] A matching method executed by a server device, the method including:

acquiring user information about a target user, among users that have accessed a second service via link information set in content that a content creator posts to a first service, that has an account with the second service; and performing processing, using the user information, for assisting matching of a sponsor and the content creator.

[11] A non-transitory computer-readable recording medium storing a program that causes a computer to:

acquire user information about a target user, among users that have accessed a second service via link information set in content that a content creator posts to a first service, that has an account with the second service; and execute processing, using the user information, for assisting matching of a sponsor and the content creator.

As described above, according to the present disclosure, a server device, a matching method, and a recording medium capable of presenting a more suitable content creator to a sponsor can be provided.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. A server device comprising:
one or more processors; and
computer program code comprising instructions for execution by the one or more processors, the computer program code comprising:
acquisition code configured to cause the one or more processors to:
acquire user information about a target user, among users that have accessed a second service via link information set in content that a content creator posts to a first service, that has an account with the second service, by identifying, based on information obtained by a cookie feature or a conversion application programming interface (CAPI) feature when the second service is accessed via the link information and for each of a plurality of the content creator, correspondence between the content creator and the target user, and acquire the user information associated with each of the content creator; and matching code configured to cause the one or more processors to:
use the user information to perform processing for assisting matching of a sponsor and the content creator by determining, based on processing results obtained by performing statistical processing on the user information associated with each of the plurality of the content creators and from among the plurality of the content creators, a plurality of score values associated with a plurality of candidate content creators, wherein the determining comprises performing the statistical processing in accordance with a product or a service, that is a promotion target, that the sponsor desires to promote, and displaying, based on the obtained processing results, the plurality of candidate content creators from whom promoting of the promotion target may be requested, wherein the displaying comprises displaying a table indicating the plurality of candidate content creators, with a number of registered users and the respective score value for each content creator of the plurality of candidate content creators,
receive a bid from each content creator of the plurality of candidate content creators, wherein the bid corresponds to a promotion request associated with the sponsor,
receive an activation of a button in the table associated with the content creator of the plurality of candidate content creators, wherein the button corresponds to the content creator, and
send a promotion request to the content creator.

2. The server device according to claim 1, wherein the matching code is further configured to cause the one or more processors to sort, based on the processing results, a list of the candidate content creators.

3. The server device according to claim 1, wherein the acquisition code is further configured to cause the one or more processors to acquire the user information that includes at least any one among age information, gender information, salary information, vehicle ownership information, bank account information, insurance enrollment information, securities account information, and purchase history information.

4. A matching method to be executed by a server device, the matching method comprising:

acquiring user information about a target user, among users that have accessed a second service via link information set in content that a content creator posts to a first service, that has an account with the second service, by identifying, based on information obtained by a cookie feature or a conversion application programming interface (CAPI) feature when the second service is accessed via the link information and for each of a plurality of the content creator, correspondence between the content creator and the target user, and acquire the user information associated with each of the content creator; and
using the user information to perform processing for assisting matching of a sponsor and the content creator by determining, based on processing results obtained by performing statistical processing on the user information associated with each of the plurality of the content creators and from among the plurality of the content creators, a plurality of score values associated with a plurality of candidate content creators, wherein the determining comprises performing the statistical processing in accordance with a product or a service, that is a promotion target, that the sponsor desires to promote, and displaying, based on the obtained processing results, the plurality of candidate content creators from whom promoting of the promotion target may be requested, wherein the displaying comprises displaying a table indicating the plurality of candidate content creators, with a number of registered users and the respective score value for each content creator of the plurality of candidate content creators, receiving a bid from each content creator of the plurality of candidate content creators, wherein the bid corresponds to a promotion request associated with the sponsor, receiving an activation of a button in the table associated with the content creator of the plurality of candidate content creators, wherein the button corresponds to the content creator, and sending a promotion request to the content creator.

5. A non-transitory computer-readable recording medium storing a computer program code for execution by a computer, the computer program code comprising: acquisition code configured to cause the one or more processors to:

acquire user information about a target user, among users that have accessed a second service via link information set in content that a content creator posts to a first service, that has an account with the second service, by identifying, based on information obtained by a cookie feature or a conversion application programming interface (CAPI) feature when the second service is accessed via the link information and for each of a plurality of the content creator, correspondence between the content creator and the target user, and acquire the user information associated with each of the content creator; and matching code configure to cause the one or more processors to:

use the user information to perform processing for assisting matching of a sponsor and the content creator by determining, based on processing results obtained by performing statistical processing on the user information associated with each of the plurality of the content creators and from among the plurality of the content creators, a plurality of score values associated with a plurality of candidate content creators, wherein the determining comprises performing the statistical processing in accordance with a product or a service, that is a promotion target, that the sponsor desires to promote, and displaying, based on the obtained processing results, the plurality of candidate content creators from whom promoting of the promotion target may be requested, wherein the displaying comprises displaying a table indicating the plurality of candidate content creators, with a number of registered users and the respective score value for each content creator of the plurality of candidate content creators, receive a bid from each content creator of the plurality of candidate content creators, wherein the bid corresponds to a promotion request associated with the sponsor, receive an activation of a button in the table associated with the content creator of the plurality of candidate content creators, wherein the button corresponds to the content creator, and send a promotion request to the content creator.

6. The method of claim 4, further comprising determining the score value based in part on a degree of similarity between a category of a promotion target and a purchase product category for each of the plurality of content creators.

* * * * *